Sept. 29, 1964   G. W. ARMSTRONG ETAL   3,151,283
UNBALANCED RELAY MOTOR CONTROL SYSTEM
Filed May 9, 1960   2 Sheets-Sheet 1
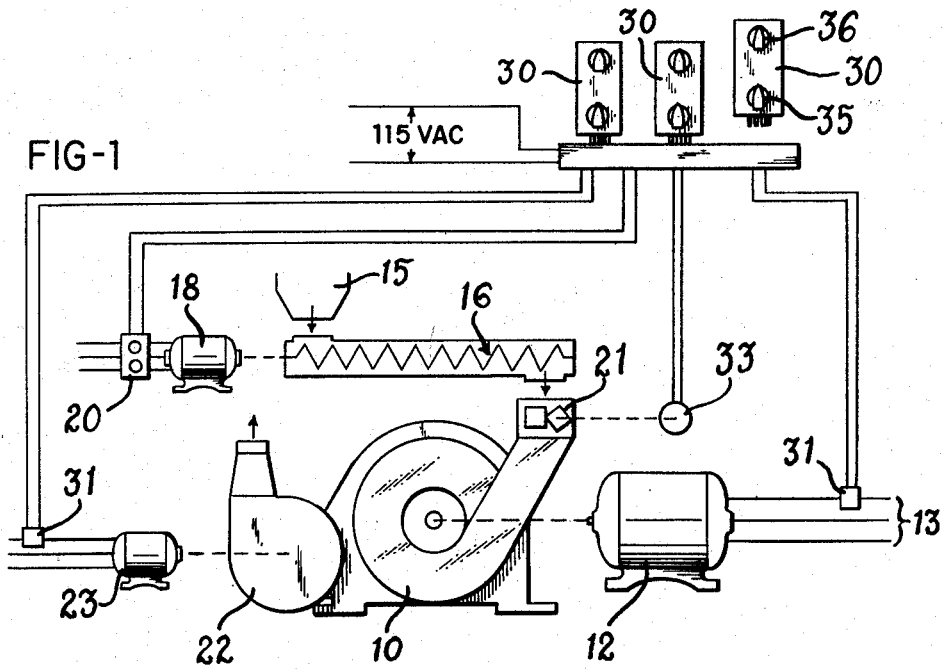
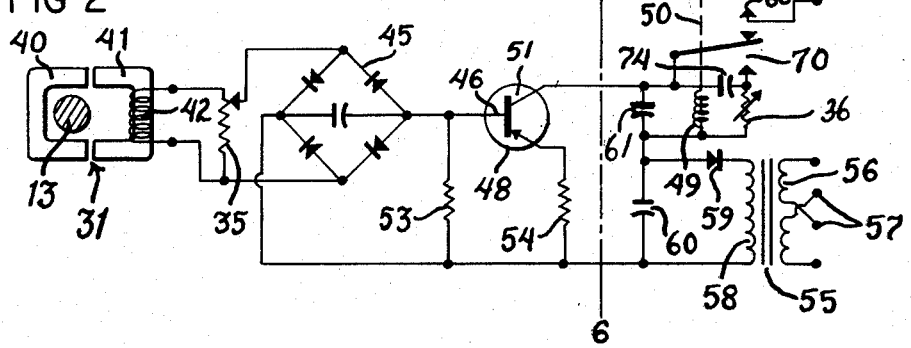
INVENTORS
GEORGE W. ARMSTRONG &
ROBERT J. NEFF
BY
*Marechal, Biebel, French & Bugg*
ATTORNEYS Sept. 29, 1964  G. W. ARMSTRONG ETAL  3,151,283
UNBALANCED RELAY MOTOR CONTROL SYSTEM
Filed May 9, 1960  2 Sheets-Sheet 2

INVENTORS
GEORGE W. ARMSTRONG &
ROBERT J. NEFF
BY
ATTORNEYS

United States Patent Office 3,151,283
Patented Sept. 29, 1964

3,151,283
UNBALANCED RELAY MOTOR CONTROL
SYSTEM
George W. Armstrong, % O. B. Armstrong & Son, Fairborn, Ohio, and Robert J. Neff, Rte. 1, Medway, Ohio
Filed May 9, 1960, Ser. No. 27,670
9 Claims. (Cl. 318—29)

This invention pertains to control relays and more particularly to a signal monitoring relay controller for opening and closing an electrical circuit in accordance with the magnitude of an input signal.

This invention is particularly useful for controlling the rate or the operation of one motor or drive in accordance with the measured load on another motor, such as where a feed motor delivering grain to a hammer mill is to be accurately controlled in accordance with the load on the electric mill drive motor to prevent overload thereof and to provide a consistently high output. Further examples of the employment of a device constructed according to this invention occurs where it is desired to control the making and breaking of one or more electric circuits in accordance with the magnitude of current in a power lead. This is particularly accomplished by controlling the cut-in point of a relay, and the range or spread between its cut-in point and drop-out point.

It is a demonstratable fact that it requires less than 25%, and usually only about 10%, of the current in a relay coil to hold in the relay armature as compared to the current required to pull it in. This invention provides a device suitable for use as a trip relay wherein the spread between the cut-in and drop-out current may be varied and controlled to achieve sensitivity and fine control. This is accomplished by the provision of a relay coil control circuit including a variable resistance which may be placed in series or in shunt with the holding coil of a relay after the closing of the relay to decrease the coil current by a predetermined and variable amount.

Where an A.-C. current is to be monitored, the invention preferably employs a split pick-up core which may be placed about a current carrying wire without the necessity of cutting or extending such wire, such as is the practice in the installation of commercial trip relays. The invention also preferably includes a transistor having its base operated by a rectified signal from such core, and a potentiometer or other signal dividing device interposed between the pick-up core and the base of the transistor to provide control of sensitivity. The relay coil is placed in the emitter-collector circuit of such transistor for operation from a source of coil and transistor supply power.

A further embodiment provides for the upper and lower limit control of a parameter, or bi-directional control, such as the control of the speed of a feed motor through a bi-directional speed controller, by suitably combining a pair of the trip relays of this invention. This combination establishes a given range of operation of the measured parameter, such as a motor load, so that an increase above or a decrease below such established range closes one of a pair of circuits for corrective action.

Another embodiment is particularly adapted to the control of a D.-C. input signal about a zero or a null point using an arrangement of P–N–P and N–P–N transistors operating a pair of relays from a common power supply.

The components of the invention lend themselves to miniaturization and modular plug-in packaging, and requiring minimum space with minimum attention for calibration or maintenance. The device of this invention also has a high degree of sensitivity and stability and includes built-in protection against damage or burn-out due to sudden overload.

It is therefore an object of this invention to provide a signal monitoring device as outlined above wherein the cut-in point of a controlling relay may be accurately determined and controlled and wherein the drop-out point may be varied in relation to the cut-in point. The device of this invention is suitable for use as a trip relay to provide for the operation of a machine at or near its maximum capacity to eliminate the inefficient start and stop operation and restarting delay provided by ordinary trip overload relay control.

A further object of this invention is to provide a transistorized trip relay suitable for packaging as a plug-in unit and which may be connected for the monitoring of heavy duty motors against overloads and the like without the necessity of breaking the motor circuit or rerouting the motor power leads. The plug-in versatility of this invention provides a convenience not heretofore realizable in ordinary trip relays suitable for several hundred amperes.

It is another object of this invention to provide a relay control device which is suitable for monitoring a wide variety of differing input parameters, such as rotation, angular velocity, motor overload, motor underload, signal voltages, currents, position indicators, and the like.

Another object of this invention is to provide in a single unit a trip relay device which is suitable for use with monitored current values from a few amperes or less up to several hundred amperes or more by reason of a sensitivity adjustment, and which operates to open and close an electric circuit over a selectively narrow or wide range in such monitored current by reason of a range adjustment.

A further object of this invention is to provide a trip relay as outlined above characterized by low initial cost, versatility and dependability.

Other objects and advantages of the invention will be apparent from the following description, the accompanying drawings and the appended claims.

In the drawings—

FIG. 1 is a diagram showing applications of this invention for the control of a hammer mill installation wherein the load on the mill motor, the load on the blower motor, and the continued operation of the crusher is monitored to control the feeding of grain to the mill;

FIG. 2 is an electrical schematic of one of the units of this invention;

Figure 3:
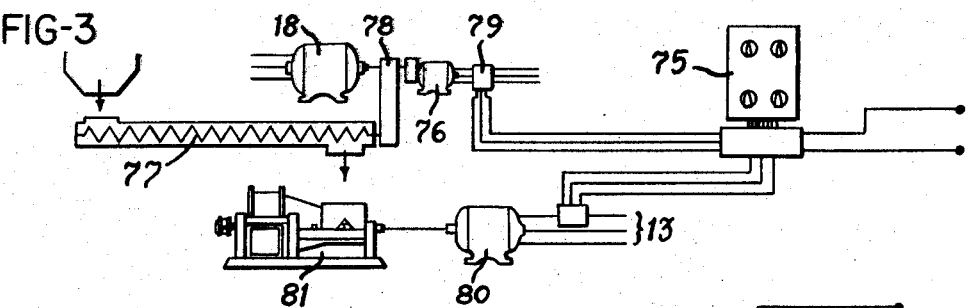
FIG. 3 is a diagram showing an arrangement for controlling the rate of feeding grain to a sheller using a modified form of the invention.

Referring to the drawings, which illustrate preferred embodiments of the invention, a hammer mill installation for pulverizing grain, such as feed corn, is shown in FIG. 1 and includes a hammer mill 10 driven by an electric drive motor 12. The motor 12 may be operated from a source of single or three phase power, as desired, and includes lead wires 13 connected to such a suitable source of motor power through a suitable motor controller, not shown.

Grain, such as corn to be crushed, is fed into the mill from a hopper 15. The hopper 15 discharges grain into a linear feed device, such as the feed screw indicated generally at 16. The feed screw 16 is caused to rotate to deliver whole grain to the mill 10 by means of a feed motor 18 which may operate through suitable reduction gearing. The on-off control of the feed motor 18 is effected by means of a suitable motor controller indicated at 20.

The linear feed screw 16 discharges the whole grain into a crusher 21 which, in turn, delivers the initially crushed grain for pulverization into the hammer mill 10. A blower 22, which may be operated by a separate electric motor 23, receives the pulverized grain from the hammer mill 10 and discharges it to a remote point for further processing, storage or bagging, as desired.

In hammer mill installations of the type described, it is desirable to monitor the mill motor 12 and the blower motor 23 against possible overload, and, at the same time, to provide for continued operation of the installation at or near maximum capacity. Overload monitoring is commonly done by providing overload trip relays which control the starting and the stopping of the feed screw motor 18 according to the load on the mill motor 12 or blower motor 23. Additionally, the crushing rolls of the crusher 21 are commonly provided with shear pins for the purpose of protecting the machinery against the entrance of rocks or other trash which may be entrained within the grain. Upon the shearing of such pins, it is desired that the feed screw 16 be stopped in order to prevent an undesired build-up in grain above the crusher rolls 21.

The device of this invention is shown as employed in FIG. 1 as a trip relay for monitoring and controlling the operation of the feed motor in accordance with each of the above parameters, and taking the place of the ordinary overload trip relays. The operating controls of the device is shown as being packaged into a modular-type plug-in unit 30. One each of the units 30 is provided for the monitoring of each of the above named parameters, that is the load on motor 12, the load on the blower motor 23, and the continued operation or rotation of the crusher rolls 21.

Various input means may be used for this invention, and a suitable arrangement for monitoring an A.-C. current and providing an input signal proportional to such signal is the split coil pickup 31 positioned about one of the power leads, such as the leads 13 to the motor 12 to monitor hammer mill lead. The coil 31 may be positioned about the lead 13 without any necessity for cutting the lead or rerouting it to an undesired location. Also, an identical pickup coil 31 is positioned about one of the power leads to the blower motor 23, for the purpose of monitoring blower load. The rotation of the crusher rolls 21 is conveniently detected by means of a small generator 33. It has been found that the small bicycle generators serve quite well for this purpose.

As can be seen in FIG. 1, and as will be described in greater detail in connection with the electrical schematics, each of the units 30 include a sensitivity control 35 by means of which the operating point of the unit 30 may be selected. Also, each of the units 30 include a range or differential control 36 by means of which the drop-out or release point of the unit 30 may be controlled. The electrical arrangement of the components within the unit 30 is such that the sensitivity control may be adjusted to cause the unit to operate upon the occurrence of a fraction of an ampere anywhere up to several hundred amperes in the power leads. Accordingly, identical units 30 may be used to monitor the load on the heavy duty mill motor 12 and the somewhat lighter blower motor 23, and they may also receive the signal from the small generator 33, by suitably positioning the controls 35 and 36.

The outputs of each of the units 30 are connected in series so that any one of the units 30 is operative to control the starting and the stopping of the feed screw motor 18 through the motor's controller 20. The range control 36 is adjustable to determine the point at which the operation of the motor 18 is commenced in relation to the decrease in the signal picked up by the split cores 31. However, in the case of the generator 33 which monitors the presence or absence of the rotation of the crusher rolls 21, the sensitivity and range controls 35 and 36 are adjusted to cause the stopping of the motor 18 upon the failure of voltage output from the generator 33.

Referring to FIG. 2 for the details of the unit 30, the split core 31 is shown as being comprised of two halves 40 and 41. A primary power lead, indicated in section at 13, comprises a single turn primary while a secondary 42 is wound about one of the legs of the core 31. The transformer thus established by the primary and secondary windings on the core 31 comprises a current pickup for the signal monitoring device of this invention.

The sensitivity control 35 consists of a voltage dividing potentiometer connected across the secondary winding 42. Another arrangement suitable for this purpose may be the provision of a tapped secondary winding. However, the potentiometer provides greater flexibility, and is therefore preferred.

The A.-C. signal from the sensitivity control 35 is fed to a full wave rectifier bridge 45, and from there to the base 46 of a transistor 48. The transistor 48 provides the amplifying means by which a signal proportional to the current in the wire 13 may be applied to a suitable control relay. It is understood that other current amplifying means may be employed in lieu of the transistor 48, such as a vacuum tube circuit, or magnetic amplifiers, but the transistor is preferred in view of its simplicity, reliability, and its adaptability to fine and accurate control. The operating coil 49 of a double-pole, double-throw relay 50 is connected in circuit with the collector 51 of the transistor 48 and a power supply, for operation by the transistor. A load resistor 53 and a current limiting resistor 54 may be placed respectively in the base and emitter circuits to provide stability and protection against overload input currents.

The transistor and relay coil operating power supply consists of a step-down transformer 55 having a primary 56 with adjustable taps 57 for use either with 115 or 230 volt installations, as desired. The secondary 58 of the transformer 55 is connected to a half wave rectifier diode 59 and a filter capacitor 60 in circuit with the relay coil 49 and the emitter and collector of the transistor 48. A capacitor 61 is connected across the relay coil 49 for the purpose of reducing the possibility of relay contact chatter.

The relay 50 includes a first set of operating contacts connected to effect a change in a control circuit upon the pull-in of the relay 50. Preferably, such first set of contacts includes an armature 66, a normally closed contact 67 and a normally open contact 68 so that upon the pull-in of the relay armature 66, one connection is broken and another connection is made, thereby providing versatility for high or low limit control.

Relay coil current limiting means for establishing the drop-out point of the relay 50 includes a second set of contacts 70 connected to the relay coil 49 through a current shunting or limiting variable impedance or resistance consisting of the differential or range control 36, and rendered effective upon the operation of the relay to reduce the current through the relay coil. The control 36 is adjustable to regulate the drop-out current value of the relay. In the embodiment shown in FIG. 2, the variable resistance consisting of the control 36 and the relay contacts 70 are arranged so as to place the control 36 in parallel with the relay coil 49 upon the pull-in of the relay 50. This has the effect of decreasing the current flowing through the parallel path consisting of the coil 49 to a predetermined reduced value and thereby provides for the adjustment of the drop-out current value of the relay 50. A small capacitor 74 is connected across the relay contacts 70 to reduce contact arcing and chatter.

The operation of the unit shown in FIG. 2 is largely self-evident from the preceding description. It will be seen that the input of the split core transformer 31, as applied by the secondary 42, is applied to the sensitivity potentiometer 35, and from there to the base of the transistor 48 through the full wave rectifier bridge 45.

When the rectified D.-C. input signal reaches a predetermined value, as selected by the position of the sensitivity potentiometer 35, the base potential of the transistor is lowered to the point where conduction occurs from the emitter to the collector, thereby causing the pull-in of the relay 50. This pull-in point has been selected to occur at the maximum allowable current in the motor power lead 13, by the adjustment of the potentiometer 35.

The pull-in of the relay 50 may be used to effect remedial action as necessary or desired, such as the shutdown of the power associated with the lead 13 or, as in FIG. 1, the temporary stopping of the feed motor 18 through its motor controller 20. The load on the mill 10 will immediately begin to decrease in the absence of continued feed, and accordingly, the current in the lead 13 will decrease. At a preselected point determined by the adjustment of the range potentiometer 36, the relay 50 is caused to drop-out thus reestablishing the power to the feed motor with a minimum of lost time and establishing a maximum productive capacity of the mill 10.

Figure 4:
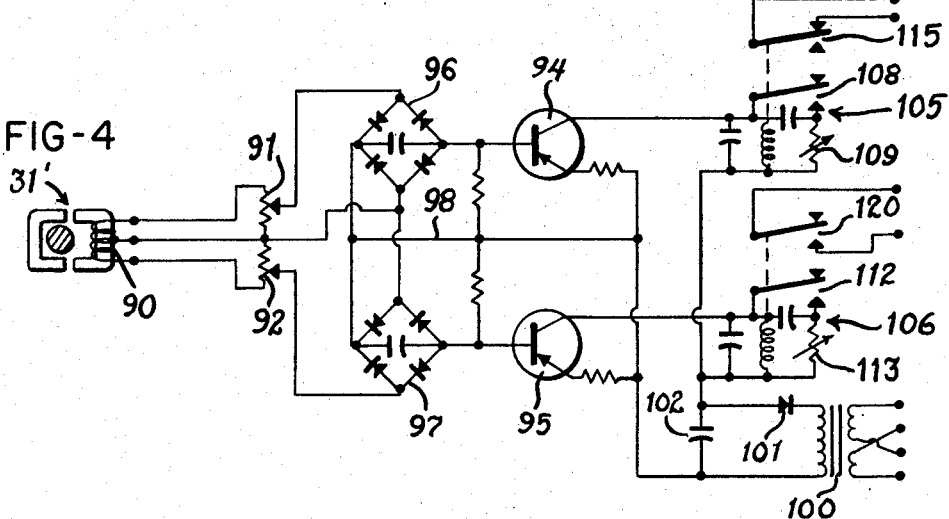
FIG. 4 is an electrical schematic showing a modified form of the unit for high and low limit control as used in FIG. 3.

The electrical diagram of FIG. 4 shows an arrangement by which two of the units of FIG. 2 may be combined into a single unit 75 for effecting bi-directional output control through a pair of individual control circuits in accordance with the value of an input signal. This arrangement is particularly useful in installations where it is desired to establish a given range of operation of a measured parameter, such as a motor load, so that an increase above a predetermined maximum or a decrease below a predetermined minimum closes one of a pair of output circuits for suitable bi-directional corrective action.

A corrective agent for use with the units of FIG. 4 may conveniently take the form of a bi-directional speed controller, such as that associated with a reversible motor which controls a sliding cone pulley in such a manner as to bring the measured parameter within the established range. One such arrangement is shown in FIG. 3 as including reversible electric motor 76 arranged to effect an increase or a decrease in the rate of feed of a feed screw 77 through a variable speed drive 78. The controller 79 of the motor 76 is connected for control by the unit 75 to maintain, within limits, a given load on a drive motor 80 connected to a sheller 81.

The arrangement and operation of the components of FIG. 4 is substantially the same as that previously described in connection with FIG. 2 except that certain elements are combined for convenience. The split core 31' includes a center tapped secondary winding 90 to provide signals which are identical in magnitude to individual sensitivity controls 91 and 92. The outputs of the controls 91 and 92 are respectively applied to the bases of transistors 94 and 95 through full wave rectifying bridges 96 and 97 which together comprise means for providing a D.-C. signal proportional to the current in the conductor 13. The bridges 96 and 97 and the emitters of the transistors are connected in a common circuit 98. A common power supply indicated by the transformer 100, a half wave rectifier 101 and a filter capacitor 102 supply transistor and relay coil operating power to the transistors 94 and 95 and the associated coils of their respective relays 105 and 106. The relays 105 and 106 with their associated transistors comprise first and second amplified relays for effecting an increase or a decrease in the load current.

The sensitivity controls 91 and 92 are connected in the base circuits of the transistors 94 and 95 and are adjusted to effect relay pull-in at different input voltages thereby establishing high and low limits of operation. For the purpose of illustration it may be assumed that the relay 105 associated with the transistor 94 is arranged to pull in at the lower end of the voltage range and the relay 106 associated with the transistor 95 is arranged to pull in at the predetermined high end of the established range. This is determined by the settings of the sensitivity potentiometers 91 and 92. The relay 105 includes a pair of contacts 108 and a variable resistor 109 connected to reduce the current through the relay coil by a controlled amount after relay pull-in. The resistor 109 is adjustable to control the drop-out point of the relay 105. Similarly, relay 106 includes contacts 112 and variable resistor 113 connected in parallel with the coil thereof for the purpose of controlling the relay drop-out point.

The normally closed control contacts 115 of the relay 105 are connected to the controller 79 of the reversible motor 76 to increase the current in the power leads 13, as by increasing the rate at which feed is supplied to the sheller 81. Similarly, the normally open contacts 120 of the relay 106 are connected to the controller 79 to decrease the current in the conductor 13 by decreasing the rate of feed delivery.

The operation of components of FIG. 4 is similar to that described in connection with FIG. 2. When the sheller motor 80 is first turned on, the current in the conductor 13 will be lower than the normal load current. The adjustment of the sensitivity potentiometer 91 is such that the relay 105 will not be energized until the current to the motor 80 reaches a predetermined normal level. Accordingly, in the unenergized position of the relay, the contacts 115 are closed to increase the rate of feed to the sheller. The occurrence of the normal load current in conductor 13 causes relay 105 to be energized thereby opening the back contacts 115 and permitting the reversible motor 76 to rest.

The motor 80 is now operating within its predetermined load range. Any load in excess of such predetermined range, as established by the setting of the potentiometer 92, causes the pull-in of the relay 106 to effect a decrease in the rate of feed. Again, as in the previous circuit, the variable resistors 109 and 113 may be adjusted to determine the release point of each of the associated relays 105 and 106. In this particular embodiment, the variable resistors 109 and 113 are not primarily depended upon to establish the range of operation of the device, since this has been established by the settings of the potentiometers 91 and 92. However, these variable resistances may be adjusted so as to effect a desired drop-out of the associated relay at a predetermined decrease in input signal, thereby assuring the transfer of control from the relay 105 to the relay 106.

Figure 5:
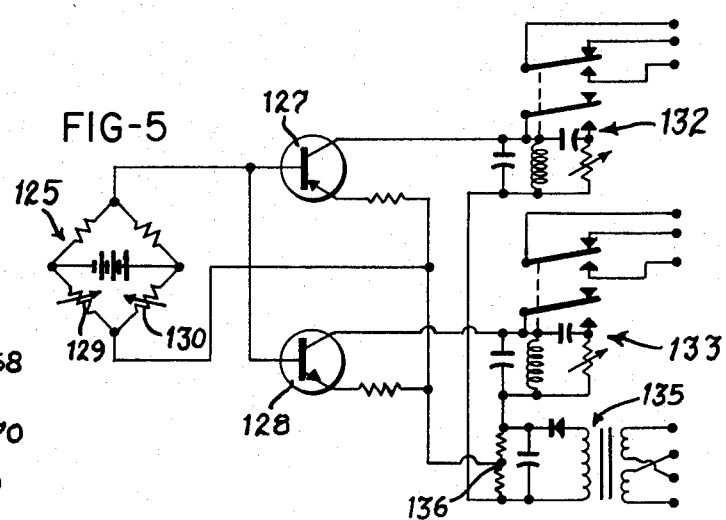
FIG. 5 is an electrical schematic of a modified form of the invention suitable for the control of a D.-C. signal about a zero point.

The embodiment of this invention in FIG. 5 shows a circuit arrangement by means of which a D.-C. input signal may be controlled about a zero or a null point using a pair of amplified relays. A D.-C. Wheatstone bridge circuit indicated generally at 125 has opposite points connected to the common bases of P–N–P and N–P–N transistors 127 and 128. An input signal is applied simultaneously to the transistors by means of a variable resistor 129 forming one leg of the bridge circuit 125. The leg 129 may be a slide wire resistor connected to a valve or any other moving device, the zero position of which is to be controlled by this embodiment. A balance or zero adjusting resistor 130 is formed in the leg of the Wheatstone bridge 125 adjacent the variable resistor 129 for the purpose of balancing the bridge in the desired balanced condition of the input parameter.

Each of the transistors 127 and 128 is connected to operate separate relays 132 and 133 in the collector circuits of their respective transistors. The relay coils and transistors are connected for operation to a common power supply 135 having a center tapped load resistor 136 for supplying D.-C. voltages of opposite polarity for the operation of the transistors 127 and 128.

The arrangement of FIG. 5 is such that movement of the input variable resistor 129 in one direction causes the conduction of one of the transistors 127, 128 and the blocking of the other, thereby effecting the energization of its associated relay 132 or 133. The primary operating contacts of the relays 132 and 133 may be suitably connected to control a reversible motor, on-off valve, or other controlling device to effect the necessary readjustment of the input leg of the Wheatstone bridge 125. Similarly, each of the relays include second sets of contacts in series with adjustable resistances for determining the drop-out point of their relays, in the manner described above. It will therefore be seen that this embodiment of the invention is effective to close a pair of output circuits as necessary in accordance with a variable D.-C. input about a zero or null point.

Figure 6:
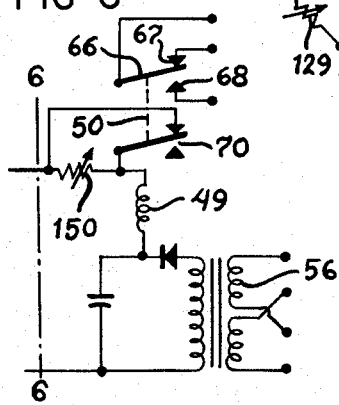
FIG. 6 is an electrical schematic of a modified portion of the circuit shown to the right of the line 66 of FIG. 2.

The embodiments described thus far have each included an arrangement for placing a variable resistance in parallel with the holding relay coil at the closing of the relay in order to decrease the amount of current flowing through the relay coil and thereby regulate the point at which the relay opens. It will be appreciated that this can also be done by placing a variable resistance in series with the relay coil upon the armature being pulled in by the relay. FIG. 6 shows a modified portion of FIG. 2 taken to the right of line 6—6 on FIG. 2 for this purpose. It will be seen that a variable resistance 150 is connected in series with the relay coil 49, and the relay contacts 70 are arranged in parallel with the variable resistance thereby shorting out the resistance and providing a low impedance path for the current through the relay coils. On the pull-in of the relay, the variable resistance 150 is placed in series with the coil and is controllable in the maner described above to limit the total current value through the coil for the purpose of controlling the drop-out points of the relay.

The units 30 of this invention are not limited to operation in response to a maximum signal value, since the back contacts 67 of the relay 50 may be employed to effect a circuit change with the release of the relay upon the occurrence of a predetermined minimum signal value. Such would be used, for example, in monitoring the rotation of the crusher 21 by monitoring the signal output of the generator 33 wherein a decrease or failure in the generator output signifies that the associated crusher roll is failing to turn at the desired speed, or that its pin has sheared. In such an event, the unit 30 would operate to stop the rotation of the feed screw 16 to prevent an undesired accumulation at the crusher 21. Also, the back contacts may be used in a light or signal circuit to indicate a predetermined minimum signal level, or may be used as an interlock with other units or devices.

It will therefore be seen that this invention provides a versatile control device which may be used as a trip relay for the monitoring of the wide variety of input parameters, such as motor currents from extremely low to extremely high values, and is fully adjustable in sensitivity to work in areas where control is critical or in heavy duty industrial applications where such critical control is neither desired nor necessary. The modular arrangements of the invention into compact plug-in units provides for simplified installation and maintenance in an industrial location.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A device for operating a control circuit according to the magnitude of a current in a load circuit, comprising a pickup for measuring the current in said load circuit and providing an electrical output proportional thereto, a transistor having a base, a collector and an emitter, means connecting the output of said current pickup to said base, a relay having a coil in the circuit of said emitter and collector for operation by said transistor, a power supply for operating said transistor and relay coil, said relay having a first set of contacts connected to operate said control circuit upon the pull-in and drop-out of said relay, and means increasing the sensitivity and establishing the drop-out point of said relay including a second set of contacts on said relay and a current limiting impedance, and means connecting said second set of contacts and impedance directly to said relay coil to reduce the current through said coil by a predetermined amount in response to relay pull-in to determine the point at which said relay releases in relation to the current in said load circuit leaving unaffected the input to said transistor base.

2. A device for operating a control circuit according to the magnitude of a current in a load circuit, comprising a pickup for measuring the current in said load circuit and providing an electrical output proportional thereto, a transistor having a base, a collector and an emitter, voltage divider means connecting the output of said current pickup to said base and operable to vary the magnitude of said signal applied to said base to establish the operating point of said device in relation to the magnitude of said current, a relay having a coil in the circuit of said emitter and collector for operation by said transistor, a power supply for said transistor and relay coil, said relay having a first set of contacts connected to operate said control circuit upon the pull-in and drop-out of said relay, and means increasing the sensitivity and establishing the drop-out point of said relay including a second set of contacts on said relay and a variable resistor, said second set of contacts and resistor being connected directly to said relay coil to reduce the current through said coil by a controlled amount in response to relay pull-in to control the point at which said relay releases in relation to the current in said load circuit leaving unaffected the input signal to said transistor base.

3. A device for monitoring the load on a first motor and controlling the operation of a second motor according to said load through the motor controller of said second motor, comprising a relay having an actuating coil, said relay having a first set of make and break contacts operated by said coil in the circuit with said motor controller for effecting the starting and stopping of said second motor, a second set of contacts on said relay, relay coil current limiting resistance means connected directly to said coil and said second set of contacts and rendered effective by the operation of said second set of contacts upon the energization of said relay coil to reduce the current through said coil, amplifier means having an input connected to receive a signal proportional to the load on said first motor and an output connected to the coil of said relay to effect the pull-in of said relay upon the occurrence of a predetermined maximum load on said first motor, and said resistance means being adjustable to control the drop-out point of said relay in relation to said load to establish a predetermined minimum load leaving unaffected the input signal to said amplifier means.

4. A signal monitoring device for controlling the opening and closing of one circuit with accurate and controlled reference to a signal generated in a second circuit comprising a transistor having a base, a collector, and an emitter, means applying an input signal to said base from said second circuit, a control relay having a coil connected to said collector and emitter for operation by said transistor, a transistor and relay coil operating power supply connected to said coil and transistor, a first set of relay contacts on said relay in said one circuit for effecting the opening and closing thereof upon the operation of said relay, relay coil sensitivity control means for controlling the differential between the pull-in and drop-out points of said relay including a second set of relay contacts, a variable current limiting impedance, said variable impedance and second set of contacts being connected directly to said relay coil to reduce the current through said relay upon the energization thereof by said transistor providing an adjustable relay drop-out point in relation to said input signal leaving unaffected said input signal to said transistor base to provide variable range control of the opening and closing of said one circuit in relation to the signal in said second circuit.

5. A device for opening and closing one circuit according to the magnitude of an A.-C. current in another circuit comprising a split pickup core positionable about a wire in said other circuit carrying said A.-C. current and having a wound secondary thereon, a transistor having a base, a collector and an emitter, rectifier means connecting said secondary to said base providing a signal thereto proportional to said A.-C. current, voltage divider means connected to vary the magnitude of said signal applied to said base to establish the operating point of said device in relation to the magnitude of said A.-C. current, a relay having a coil in the circuit of said emitter and collector for operation by said transistor, a transistor and relay coil operating power supply in circuit with said coil and transistor, said relay having a first set of contacts connected to open said one circuit upon the pull-in of said relay, and means establishing the drop-out point of said relay to close said one circuit including a second set of contacts on said relay and a variable resistor, said second set of contacts and resistor being connected to reduce the current through said coil by a controlled amount after relay pull-in to control the point at which said relay releases in relation to said A.-C. current.

6. A device for monitoring the load on a first motor and controlling the operation of a second motor according to said load through the motor controller of said second motor, comprising a relay having an actuating coil, a first set of make and break contacts operated by said coil in the circuit with said motor controller for effecting the starting and stopping of said second motor, a second set of contacts on said relay, a transistor having an emitter, a collector, and a base, said relay coil being connected in series with said emitter and collector, a source of power for said transistor arranged in series with said emitter, collector and coil, means for inductively picking up a signal proportional to the load on said first motor including a split coil positionable about a power lead having a secondary winding thereon, a current rectifier connected to apply a signal from said winding to the base of said transistor to effect the pull-in of said relay upon a predetermined maximum load on said first motor, and relay coil current limiting variable resistance means connected to said coil and said second set of contacts and rendered effective by the operation of said second set upon the closing of said relay to reduce the current through said coil and adjustable to regulate the drop-out current value of said trip relay in relation to said load.

7. A relay device for the selective control of a pair of individual circuits effective respectively to increase and decrease the current in a load carrying conductor to hold said load current within a predetermined maximum and minimum range, comprising means for providing a D.-C. signal proportional to the current in said conductor, a first amplified relay having a transistor and a coil in series with the emitter-collector circuit of said transistor and having a base connected to receive said signal from said means, said first relay being arranged to pull-in at a predetermined low current value in said conductor and having contacts connected to operate the first of said circuits upon the pull-in thereof to effect an increase in said current, a second amplified relay having a transistor and a coil in series with the emitter-collector circuit of said transistor and having a base connected to receive said signal from said means, said second relay being arranged to pull-in at a predetermined high current value in said conductor and having contacts connected to operate the other of said circuits upon the pull-in thereof to effect a decrease in said load current.

8. A relay device for the selective control of a pair of individual circuits effective respectively to increase and decrease the current in a load carrying conductor to hold said load current within a predetermined maximum and minimum range, comprising means for providing a D.-C. signal proportional to the current in said conductor, a first amplified relay having a transistor and a coil in series with the emitter-collector circuit of said transistor and having a base connected to receive said signal from said means, said first relay being arranged to pull-in at a predetermined low current value in said conductor and having contacts connected to operate the first of said pair of circuits upon the pull-in thereof to effect an increase in said current, a second amplified relay having a transistor and a coil in series with the emitter-collector circuit of said transistor and having a base connected to receive said signal from said means, said second relay being arranged to pull-in at a predetermined low current value in said conductor and having contacts connected to operate the other of said circuits to effect a decrease in said load current, each of said relays having an additional set of contacts, variable resistances, said resistances being connected to the respective said relay coils and said additional contacts to limit the coil current upon pull-in of the associated said relay coil to control the point at which said coil releases in relation to said load current.

9. A device for regulating a reversible motor to effect control of a parameter about a null position comprising a D.-C. Wheatstone bridge having a variable input leg representing said parameter and controlled by such motor, an N–P–N transistor and a P–N–P transistor each having bases connected in common to each other and in parallel across said bridge such that a given bridge output signal causes the conduction of one of said transistors and the blocking of the other, a pair of relays each having a coil connected for operation by one of said transistors, power supply means connected to operate said transistors and coils, each of said relays having contacts connected for the reversible control of such motor to effect a null condition in said bridge, each of said relays having a second set of contacts, resistance means for each of said contact sets, and means connecting said second sets and resistance means directly to the associated said relay coils upon pull-in thereof to increase the sensitivity of the associated said coil by decreasing the current therethrough by a predetermined amount leaving unaffected the input to said transistors and assuring the release of the energized relay as said bridge approaches null.

References Cited in the file of this patent
UNITED STATES PATENTS

| | | |
|---|---|---|
| 2,145,909 | Zwickl | Feb. 7, 1939 |
| 2,443,122 | Smith | June 8, 1948 |
| 2,675,514 | Smith | Apr. 13, 1954 |
| 2,685,665 | Price | Aug. 3, 1954 |
| 2,697,195 | Courtney | Dec. 14, 1954 |
| 2,729,788 | Schweitzer | Jan. 3, 1956 |
| 2,879,456 | Pinckaers | Mar. 24, 1959 |
| 2,897,413 | Hodges | July 28, 1959 |
| 2,935,660 | Patchell | May 3, 1960 |
| 2,947,916 | Beck | Aug. 2, 1960 |
| 2,959,717 | Conger | Nov. 8, 1960 |
| 2,971,142 | Montrose | Feb. 7, 1961 |
| 3,036,241 | Zelina | May 22, 1962 |